(12) United States Patent
Brandwine et al.

(10) Patent No.: US 9,432,407 B1
(45) Date of Patent: Aug. 30, 2016

(54) PROVIDING AND ACCESSING DATA IN A STANDARD-COMPLIANT MANNER

(75) Inventors: Eric J. Brandwine, Haymarket, VA (US); Stephen E. Schmidt, Herndon, VA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1538 days.

(21) Appl. No.: 12/978,981

(22) Filed: Dec. 27, 2010

(51) Int. Cl.
*H04L 29/06* (2006.01)
*H04L 29/08* (2006.01)
*H04M 3/22* (2006.01)

(52) U.S. Cl.
CPC ......... *H04L 63/30* (2013.01); *H04L 67/2823* (2013.01); *H04M 3/2281* (2013.01)

(58) Field of Classification Search
CPC ... H04L 63/30; H04L 63/302; H04L 63/304; H04L 63/306; H04L 63/308; H04L 67/2823; H04M 3/2281
USPC .............................................. 709/221; 379/35
See application file for complete search history.

(56) References Cited

U.S. PATENT DOCUMENTS

| | | | |
|---|---|---|---|
| 6,233,313 B1 | 5/2001 | Farris et al. | 379/34 |
| 6,381,220 B1 | 4/2002 | Kung et al. | 370/250 |
| 6,504,907 B1 | 1/2003 | Farris et al. | 379/35 |
| 6,741,595 B2 | 5/2004 | Maher, III et al. | 370/392 |
| 6,751,297 B2 | 6/2004 | Nelkenbaum | 379/88.13 |
| 7,106,741 B2 | 9/2006 | Dianda | 370/393 |
| 7,151,772 B1 | 12/2006 | Kalmanek, Jr. et al. | 370/390 |
| 7,283,521 B1 | 10/2007 | Ryan | 370/389 |
| 7,305,226 B2 | 12/2007 | Bui | 455/403 |
| 7,383,582 B1 | 6/2008 | Francis | 726/26 |
| 7,444,131 B2 | 10/2008 | Gayde et al. | 455/404.2 |
| 7,460,484 B2 | 12/2008 | Roberts et al. | 370/244 |
| 7,471,683 B2 | 12/2008 | Maher, III et al. | 370/392 |
| 7,587,757 B2 | 9/2009 | Scoggins et al. | 726/11 |
| 7,626,980 B1 | 12/2009 | Croak et al. | 370/352 |
| 7,680,281 B2 | 3/2010 | Fiatal et al. | 380/255 |
| 7,764,768 B2 | 7/2010 | Davis et al. | 379/35 |
| 2001/0052081 A1 | 12/2001 | McKibben et al. | 713/201 |
| 2002/0009973 A1 | 1/2002 | Bondy et al. | 455/67.2 |
| 2003/0215069 A1 | 11/2003 | Hitzeman | 379/88.19 |
| 2004/0218731 A1 | 11/2004 | Karimi-Cherkandi et al. | 379/32.01 |
| 2004/0219911 A1 | 11/2004 | Kouchri et al. | 455/423 |
| 2005/0094773 A1 | 5/2005 | Peterson | 379/35 |
| 2005/0180446 A1 | 8/2005 | Flowers et al. | 370/428 |
| 2006/0041891 A1 | 2/2006 | Aaron | 719/315 |
| 2006/0050644 A1 | 3/2006 | Roberts et al. | 370/244 |
| 2006/0062208 A1 | 3/2006 | Li et al. | 370/352 |
| 2006/0072550 A1 | 4/2006 | Davis et al. | 370/352 |

(Continued)

*Primary Examiner* — Jeong S Park
(74) *Attorney, Agent, or Firm* — Davis Wright Tremaine LLP

(57) ABSTRACT

In certain embodiments, a computer-implemented method includes receiving intercepted data associated with a first entity. The intercepted data may be intercepted in response to a request for information from a second entity. The method may include converting the intercepted data from a first format to a second format, the second format compliant with a standard for providing intercepted data to the second entity. The method may include storing, in one or more memory units, the intercepted communication data in the second format. The one or more memory units may be part of a subset of a plurality of computing resources designated for use by the first entity. The method may include storing audit data providing a record of a chain of custody of the intercepted communication data. The method may include providing access to a portion of the stored intercepted communication data in the second format to the second entity.

31 Claims, 6 Drawing Sheets

(56) References Cited

U.S. PATENT DOCUMENTS

| | | | |
|---|---|---|---|
| 2007/0121812 A1 | 5/2007 | Strange et al. | 379/70 |
| 2007/0143858 A1 | 6/2007 | Hearty | 726/27 |
| 2007/0178894 A1 | 8/2007 | Gayde et al. | 455/432.1 |
| 2007/0294209 A1* | 12/2007 | Strub | H04L 63/102 |
| 2008/0137825 A1 | 6/2008 | Yoon et al. | 379/112.01 |
| 2008/0170117 A1* | 7/2008 | Xiao | H04M 3/2281 348/14.12 |
| 2008/0276294 A1* | 11/2008 | Brady | H04L 63/08 726/1 |
| 2008/0301282 A1 | 12/2008 | Coleman | 709/224 |
| 2009/0041011 A1 | 2/2009 | Sheppard | 370/360 |
| 2009/0074156 A1 | 3/2009 | Ku et al. | 379/35 |
| 2009/0100040 A1 | 4/2009 | Sheppard et al. | 707/5 |
| 2009/0113036 A1 | 4/2009 | Zampiello | 709/224 |
| 2009/0207751 A1 | 8/2009 | Attanasio et al. | 370/252 |
| 2009/0232128 A1 | 9/2009 | Paulis et al. | 370/352 |
| 2009/0234845 A1 | 9/2009 | DeSantis et al. | 705/5 |
| 2009/0254650 A1 | 10/2009 | Sheppard | 709/224 |
| 2009/0254651 A1 | 10/2009 | Sheppard | 709/224 |
| 2009/0276521 A1 | 11/2009 | Vizaei | 709/224 |
| 2010/0003955 A1 | 1/2010 | Ray et al. | 455/404.1 |
| 2010/0005188 A1 | 1/2010 | Solis et al. | 709/232 |
| 2010/0074425 A1 | 3/2010 | Croak et al. | 379/142.04 |
| 2010/0083364 A1 | 4/2010 | Fernandez Gutierrez | 726/13 |
| 2010/0099436 A1 | 4/2010 | Dammrose | 455/456.6 |
| 2010/0154047 A1 | 6/2010 | Roach et al. | 726/9 |
| 2010/0161790 A1 | 6/2010 | Sheppard | 709/224 |
| 2010/0199189 A1 | 8/2010 | Ben-Aroya et al. | 715/736 |
| 2010/0299173 A1 | 11/2010 | Zampiello et al. | 705/8 |
| 2011/0010634 A1* | 1/2011 | Hatasaki | G06F 9/5011 715/739 |
| 2011/0093471 A1* | 4/2011 | Brockway | G06F 17/30616 707/747 |
| 2011/0142240 A1* | 6/2011 | Yoon | H04L 63/302 380/278 |

* cited by examiner

PROVIDING AND ACCESSING DATA IN A STANDARD-COMPLIANT MANNER

BACKGROUND

An entity such as a business, university, or individual may find it appropriate to capture certain information and to provide that information to another entity. For example, a first entity may receive a request to provide information to a second entity. If the first entity determines that the request is legitimate, the first entity may capture information responsive to the request and provide some or all of the captured information to the second entity. In some scenarios, the first entity may provide the information to the second entity in a manner compliant with a pertinent standard.

As just one particular example, as part of a warrant or other potentially-legitimate request, a law enforcement agency may request that an entity capture certain information and provide some or all of that information to the law enforcement agency, possibly in a manner compliant with an applicable standard. One example of such a compliance standard is defined by the Communications Assistance for Law Enforcement Act (CALEA). Capturing and providing the responsive information in a timely manner may be a difficult, expensive, and time consuming process for the responding entity, particularly when subject to an applicable standard. In some situations, failing to respond to the request in a timely and appropriate manner may result in monetary fines, seizure of property, or other consequences potentially detrimental to the entity receiving the request.

BRIEF DESCRIPTION OF THE DRAWINGS

For a more complete understanding of the present disclosure and its advantages, reference is made to the following descriptions, taken in conjunction with the accompanying drawings, in which.

DESCRIPTION OF EXAMPLE EMBODIMENTS

Figure 1:
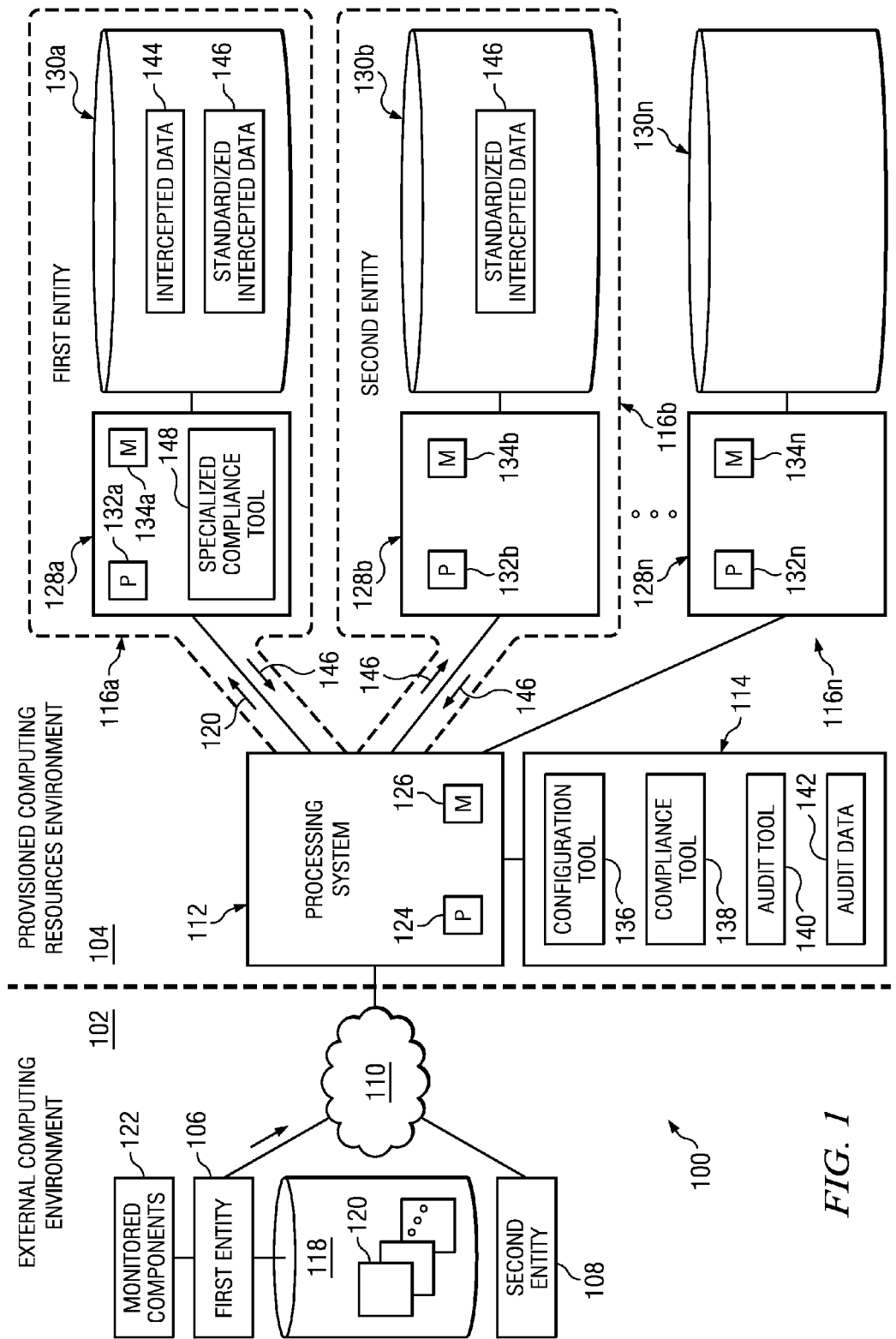
FIG. 1 illustrates an example system for providing and accessing data in a standard-compliant manner, according to certain embodiments of the present disclosure.

As described above, an entity may be in a position to capture certain information and provide some or all of the captured information to a second entity, possibly in response to a request from the second entity. Throughout this disclosure, reference to providing the information may include actually providing the information to another entity or otherwise making the information available to the other entity.

As just one example, the entity requesting information from another entity may be a law enforcement agency and the entity responding to the request for information may be a business enterprise. The law enforcement agency may be, for example, the Federal Bureau of Investigations (FBI), the National Security Agency/Central Security Service (NSA/CSS), a state law enforcement agency, a local police department, or any other suitable law enforcement agency such as one capable of obtaining and enforcing a warrant. The business enterprise may include any suitable type of business, with one example being a communications service provider. In this scenario in which the requesting entity is a law enforcement agency and the responding entity is a communications service provider, the request for information could be a warrant for the communications service provider to establish a wiretap and capture information associated with communication sessions facilitated by the communications service provider, including potentially message content.

In some scenarios, the first entity may provide the information to the second entity in a manner compliant with an applicable standard. For example, the standard may be specified by the requesting entity and/or may be specified by law, regulation, or other applicable authority. The pertinent standard in the case of a law enforcement information request of a communications service provider may be specified in the Communications Assistance for Law Enforcement Act (CALEA). Providing the information in a manner complaint with the standard (e.g., the CALEA) may include providing the information in a particular format, converting the information between or among a variety of formats, providing an audit trail for the information, providing certain reporting capabilities with respect to the information, providing an appropriate communications interface, and other suitable requirements.

Complying with the standard such as the CALEA may impose certain burdens on the entity providing the information. Depending on the type and time frame of the information request, large quantities of data may be responsive to request, and purchasing and maintaining sufficient resources for handling this data may be difficult and costly. The entity may be required to purchase and maintain certain information technology (IT) infrastructure for responding to the request. For example, the IT infrastructure may include software for complying with the standard. As another example, such IT infrastructure may include dedicated hardware for use in case of receiving a request for information. Purchasing and maintaining this IT infrastructure may be particularly burdensome given that the IT infrastructure may be unused unless and until the entity actually receives a request to provide the information in compliance with the standard. Alternatively, if the entity waits to purchase and set up the appropriate IT infrastructure until a request for information is received, the entity may have insufficient time to set up the infrastructure. In some cases, failing to respond to the request in timely manner may result in additional costs and/or result in seizure of some or all of the entity's IT infrastructure.

Certain embodiments of the present disclosure ease the burden on an entity for providing information to another entity in a manner compliant with an applicable standard. For example, certain embodiments allow a responding entity to use a provisioned computing resources environment maintained by a third party to store and maintain information captured in response to an information request in a manner that is compliant with an applicable standard. While in some scenarios the responding entity may still bear responsibility for capturing information responsive to the request, allowing the responding entity to offload the burden of storing and maintaining the responsive information may reduce or eliminate various costs and other problems associated with responding to such information requests. Some embodiments may assist the responding entity in responding to the information request in a timely manner, which may avoid further costs and/or seizure of property.

Additionally or alternatively, some embodiments of the present disclosure allow a requesting entity (i.e., an entity requesting that another entity provide information according to an applicable standard) to access data that has been provided in a standard-compliant manner, and to convert that data from a standard-compliant format to one or more formats suitable for use by the entity. For example, certain embodiments allow a requesting entity to use a provisioned computing resources environment maintained by a third party to store and maintain information provided by another entity in a standards-compliant manner.

Although embodiments in which the requesting entity is a law enforcement agency and the responding entity is a communications service provider are primarily described, it should be understood that the present disclosure contemplates system 100 and techniques consistent with the present disclosure being used for any suitable types of entities, according to particular needs. For example, either or both of the requesting and responding entity may be a law enforcement agency, a business, a university, a government (e.g., a governmental branch, agency, or other suitable division), an individual, or any other suitable type of entity that may request and/or provide information in a manner compliant with a standard. Additionally, embodiments, in which the applicable standard is specified in the CALEA, it should be understood that the present disclosure contemplates the applicable standard being any suitable standard for providing information responsive to a request.

FIG. 1 illustrates an example system 100 for providing and accessing data in a standard-compliant manner, according to certain embodiments of the present disclosure. In the illustrated example, system 100 includes an external computing environment 102 and a provisioned computing resources environment 104. External computing environment 102 may include a user system 106 associated with a first entity and a user system 108 associated with a second entity. A network 110 may couple, permanently or at any other suitable interval, components of external computing environment 102 to components of provisioned computing resources environment 104. Provisioned computing resources environment 104 may include a processing system 112, a storage module 114, and one or more computing resources 116. Although system 100 is illustrated and primarily described as including particular numbers and types of components arranged in a particular manner, the present disclosure contemplates system 100 including any suitable numbers and types of components arranged in any suitable manner, according to particular needs.

Portions of system 100 may provide an environment in which one or more computing resources (e.g., computing resources 116) of provisioned computing resources environment 104 are made available over a communication network (e.g., network 110) to one or more remote computer systems (e.g., user system 106 and/or 108) of external computing environment 102. In certain embodiments, a portion or all of the components of provisioned computing resources environment 104 form a computing infrastructure which may be communicatively coupled together over a high speed communication network. For example, processing system 112, storage module 114, and computing resources 116 may comprise a computing infrastructure and be communicatively coupled together over a high speed communication network. User system 106, user system 108, and/or network 110 may be external to provisioned computing resources environment 104.

In certain embodiments, provisioned computing resources environment 104 (including, for example, one or more of processing system 112, storage module 114, and computing resources 116) may provide a collection of remote computing services offered over a network (e.g., network 110). Those computing services may include, for example, storage, power, processors, applications, or any other suitable computing resources that may be made available over network 110. In certain embodiments, entities accessing those computing services may gain access to a suite of elastic information technology (IT) infrastructure services (e.g., computing resources 116) as the entity requests those services. Provisioned computing resources environment 104 may provide a scalable, reliable, and secure distributed computing infrastructure.

In general, a first entity (e.g., via user system 106) associated with external computing environment 102 may use computing resources 116 associated with provisioned computing resources environment 104 to provide information to a second entity (e.g., associated with user system 108) in a manner compliant with an applicable standard. Computing resources 116 used by the first entity may include storage, processing, and/or other suitable computing resources, which may be provided to the first entity in a secure manner. For example, the first entity, using user system 106, may store information responsive to an information request of a second entity using computing resources 116 that have been designated for use by the first entity. Components of provisioned computing resources environment 104 may facilitate the storage and maintenance of the data in a manner that is compliant with the applicable standard. A second entity (i.e., an entity requesting that another entity provide information according to an applicable standard) associated with external computing environment 102 may use computing resources 116 to access data that has been provided in a standard-compliant manner, and to convert that data to from a standard-compliant format to one or more formats suitable for use by the second entity.

User systems 106 and 108 may each include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal data assistant (PDA), one or more Internet Protocol (IP) telephones, one or more servers, a server pool, one or more processors within these or other devices, or any other suitable processing device. Each of user systems 106 and 108 may be a stand-alone computer or may be a part of a larger network of computers associated with an entity.

User systems 106 and 108 may each include a processing unit and a memory unit. The processing unit may include one or more microprocessors, controllers, or any other suitable computing devices or resources. The processing unit may work, either alone or with other components of system 100, to provide a portion or all of the functionality of its associated user system 106, 108 described herein. The memory unit may take the form of volatile or non-volatile memory including, without limitation, magnetic media, optical media, RAM, ROM, removable media, or any other suitable memory component.

As described above, user system 106 may be associated with a first entity, and user system 108 may be associated with a second entity. Each of the first and second entities may be any suitable type of entity. For example, each entity may be a corporation, a university, a government (e.g., a governmental branch, agency, or other suitable division), an individual, or any other suitable type of entity. The first and second entities may be the same type or different types of entities. For purposes of this description, it will be assumed that the second entity requests information be provided by the first entity to the second entity in a manner compliant with a standard.

As described above, in a particular example the second entity may be a law enforcement agency, and the first entity may be a communications service provider. As another example, the law enforcement agency may include a Federal and/or state law enforcement agency, such as the FBI, the NSA/CSS, a state or local police department or other law enforcement agency, or any other suitable law enforcement agency. In some embodiments in which the second entity is a law enforcement agency, the first entity may be responding to a warrant or other request for information from the law enforcement agency. As a more particular example, in an embodiment in which the first entity is a communications service provider, the request for information may be based on a warrant authorizing a wiretap.

User system 106 may be coupled to or otherwise associated with a storage module 118. Storage module 118 may take the form of volatile or non-volatile memory including, without limitation, magnetic media, optical media, read-access memory (RAM), read-only memory (ROM), removable media, or any other suitable memory component. In certain embodiments, a portion of all of storage module 118 may include a database, such as one or more structured query language (SQL) servers or relational databases. Storage module 118 may be a part of or distinct from a memory unit of user system 106.

Storage module 118 may store intercepted data 120. For example, user system 106 may capture and store intercepted data 120 in storage module 118. Intercepted data 120 may include any data responsive to an information request of the second entity, a portion or all of which ultimately may be made available to the second entity. In an example in which the first entity is a communications service provider, the second entity is a law enforcement agency, and the request is a wiretap order, intercepted data 120 may include data that is captured from communication sessions and may be referred to as intercepted communication data.

The intercepted communication data (e.g., intercepted data 120) may be data generated during one or more communication sessions by one or more users (e.g., subscribers or other users) of a communication infrastructure provided or otherwise managed by the communications service provider. For example, the intercepted communication data may be captured from communication sessions as part of the wiretap set up in response to the wiretap order.

Intercepted communication data (e.g., intercepted data 120) may include one or more of metadata regarding a communication session (e.g., caller identity, callee identity, caller phone number, callee phone number, or other suitable information) and communication session content (e.g., a recorded conversation, a message content, etc.). The communication may be a voice session, a data session, a combination of a voice and data session, or any other suitable type of communication session. Although described as intercepted, intercepted data 120 may be captured in any suitable manner, according to particular needs.

In certain embodiments, the information to be captured and stored by user system 106 may be captured from one or more monitored components 122. Monitored components 122 may include any suitable types of electronic devices operable to generate or otherwise process data. In certain embodiments, user system 106 captures intercepted data 120 (e.g., intercepted communication data) from monitored components 122. The logic that is responsible for capturing the intercepted data 120 may be stored on user system 106, monitored components 122, or at any other suitable location, and may include any suitable combination of hardware, firmware, and software.

In an example in which the request for information is a request for intercepted communication data (e.g., a wiretap warrant) and the first entity (associated with user system 106 in this example) is a service provider, monitored components 122 may include a portion or all of a communications network infrastructure by which communications may be processed. Intercepted data 120 in this example may include information captured by tapping into communications over a network of monitored components 122.

As described briefly above, certain types of information requests (e.g., from a second entity to a first entity) may specify that information responsive to the request be provided in a manner compliant with an appropriate standard (e.g., the CALEA with at least certain law enforcement requests). Providing information in a manner compliant with a standard may include capturing the information in a particular manner, formatting the captured information in a particular manner, storing the information in a particular manner, storing information associated with a number of auditable events (e.g., to provide a chain of title of the information, or any of a number of other operations).

Furthermore, depending on the type and time frame of information request, large quantities of intercepted data 120 may be captured. With certain standards, such as the CALEA, an entity responding to a request (e.g., the first entity) may be given a time period in which to at least begin providing responsive information in a manner compliant with the standard. If the entity fails to provide the information in the time period and/or in a manner compliant with the standard, the entity may be subject to fines and/or seizure of property, such as IT assets of the entity. The seizure of this property may present a significant disruption to the entity and, if the entity is a business, result in a loss of business. Thus, at least certain entities may find it appropriate to be prepared to handle such information in a timely and compliant manner. Embodiments of the present disclosure allow an entity (e.g., the first entity associated with user system 106) to use provisioned computing resources environment 104 for providing information to the second entity in a manner compliant with a standard.

User system 106 associated with the first entity may access provisioned computing resources environment 104 via a network 110. Network 110 facilitates wireless or wireline communication. Network 110 may communicate, for example, IP packets, Frame Relay frames, Asynchronous Transfer Mode (ATM) cells, voice, video, data, and other suitable information between network addresses. Network 104 may include one or more local area networks (LANs), radio access networks (RANs), metropolitan area networks (MANs), wide area networks (WANs), mobile networks (e.g., using WiMax (802.16), WiFi (802.11), 3G, or any other suitable wireless technologies in any suitable combination), all or a portion of the global computer network known as the Internet, and/or any other communication system or systems at one or more locations, any of which may be any suitable combination of wireless and wireline. In certain embodiments, network 110 comprises one or more virtual private connections through which entities (e.g., user system 106 and/or user system 108) may communicate with appropriate components of provisioned computing resources environment 104.

As described above, provisioned computing resources environment 104 may include processing system 112, storage module 114, and computing resources 116. Although provisioned computing resources environment 104 is illustrated as including these particular components, the present disclosure contemplates provisioned computing resources environment 104 including any suitable components according to particular needs.

Processing system 112 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, one or more servers, a server pool, switch, router, disks or disk arrays, one or more processors within these or other devices, or any other suitable processing device. Processing system 112 may be a stand-alone computer or may be a part of a larger network of computers associated with an entity.

Processing system 112 may include processing unit 124 and memory unit 126. Processing unit 124 may include one or more microprocessors, controllers, or any other suitable computing devices or resources. Processing unit 124 may work, either alone or with other components of system 100, to provide a portion or all of the functionality of provisioned computing resources environment 104 described herein. Memory unit 126 may take the form of volatile or non-volatile memory including, without limitation, magnetic media, optical media, RAM, ROM, removable media, or any other suitable memory component.

Processing system 112 may facilitate making computing resources 116 available over a network (e.g., network 110) and may manage the provision of computing resources 116 to other computing systems (e.g. user systems 106 and 108) over network 110. For example, processing system 112 may control access to and rationing of computing resources 116 to other computing systems over network 110.

In certain embodiments, processing system 112 may be used by user systems 106 and/or 108 to access provisioned computing resources environment 104. For example user systems 102 and 106 may be able to access processing system 112 to set aside computing resources 116 to be designated for use by the user system and to configure the designated computing resources 116 for a desired use. In certain embodiments, processing system 112 may facilitate user system 106 making information available to a second entity in a manner that is compliant with a standard. Additionally or alternatively, processing system 112 may facilitate user system 108 accessing a portion or all of information that has been made available to the second entity by the first entity in a manner that is compliant with the standard. Additional details regarding the operations provided by processing system 112 are described in greater detail below after the following description of computing resources 116.

Computing resources 116 may include any suitable computing resources that may be made available over a network (e.g., network 110). Computing resources 116 may include any suitable combination of hardware, firmware, and software. As just a few examples, computing resources 116 may include any suitable combination of applications, processors, storage, and any other suitable computing resources that may be made available over network 110. Computing resources 116 may each be substantially similar to one another or may be heterogeneous. As described above, entities accessing computing services provided by provisioned computing resources environment 104 may gain access to a suite of elastic IT infrastructure services (e.g., computing resources 116) as the entity requests those services. Provisioned computing resources environment 104 may provide a scalable, reliable, and secure distributed computing infrastructure, and may be implemented through a web services application programming interface (API).

In the illustrated example, each set of computing resources 116 (e.g., computing resources 116a, 116b . . . 116n) includes a computing system 128 and a storage module 130. Although this particular configuration of computing resources 116 is illustrated and primarily described, the present disclosure contemplates system 100 including any suitable configuration of computing resources 116, according to particular needs.

Each computing system 128 may comprise a processing unit 132 and a memory unit 134. Processing unit 132 may include one or more microprocessors, controllers, or any other suitable computing devices or resources. Processing unit 132 may work, either alone or with other components of system 100, to provide a portion or all of the functionality of system 100 described herein. Memory unit 134 may take the form of volatile or non-volatile memory including, without limitation, magnetic media, optical media, RAM, ROM, removable media, or any other suitable memory component. In certain embodiments, a portion of all of memory unit 134 may include a database, such as one or more SQL servers or relational databases. Storage module 130 may be a part of or distinct from memory unit 134 of computing system 128.

Returning to processing system 112, processing system 112 may be coupled or otherwise associated with a storage module 114. Storage module 114 may take the form of volatile or non-volatile memory including, without limitation, magnetic media, optical media, RAM, ROM, removable media, or any other suitable memory component. In certain embodiments, a portion of all of storage module 114 may include a database, such as one or more SQL servers or relational databases. Storage module 114 may be a part of or distinct from memory unit 126 of processing system 112.

Storage module 110 may store a variety of information and applications that may be used by processing system 112 or other suitable components of system 100. In the illustrated example, storage module 114 stores configuration tool 136, compliance tool 138, audit tool 140, and audit data 142, each of which are described in greater detail below. Although storage module 114 is described as including these particular information and applications, storage module 114 may store any other suitable information and applications. Furthermore, although these particular information and applications are described as being stored in storage module 114, the present description contemplates storing this particular information and applications in any suitable location, according to particular needs.

As described briefly above, in response to an information request (e.g., from an entity associated with user system 108), an entity associated with user system 106 may use provisioned computing resources environment 104 to store information responsive to the request (e.g., intercepted data 120) in a manner compliant with an applicable standard. The applications and data of storage module 114 may facilitate the storing of such information in a manner compliant with the standard. The roles of the components of storage module 114 in facilitating the storing of such information in a manner compliant with the standard, according to certain embodiments of the present disclosure, are described in greater detail below.

Configuration tool 136 may be operable to assist an entity in setting aside computing resources 116 to be designated for use by the entity, and to configure the designated computing resources 116 for a desired use. For a first entity that is responding to a request for information, the desired use may include, for example, providing intercepted data 120 to a second entity in a manner compliant with a standard. Configuration tool 136 may assist the first entity in configuring computing resources 116 designated for use by the first entity to provide data to the second entity in a manner compliant with the standard. For the second entity, which may be provided the standardized intercepted information, the desired use may include, for example, converting the standardized intercepted data to a format more useful to the second entity. Configuration tool 136 may assist the second entity in configuring computing resources 116 designated for use by the second entity to convert data from a standard-compliant format (e.g., the format in which it was provided to the second entity by the first entity) to another format that may be more useful to the second entity.

In certain embodiments, configuration tool 136 may be a part of a larger application for monitoring or otherwise managing the provision of computing resources 116 over a network. An example method for configuring computing resources 116 for providing data in a standard-compliant manner is described in detail below with respect to FIG. 2.

Compliance tool 136 may comprise any suitable combination of hardware, firmware, and software. Compliance tool 136 may facilitate ensuring that intercepted data 120 received from the first entity is provided to the second entity in a manner compliant with the applicable standard. For example, compliance tool 136 may use various rules and other functions to ensure the proper formatting and reporting for ensuring that intercepted data 120 received from the first entity is provided to the second entity in a manner compliant with the applicable standard. As just one particular example, compliance tool 136 may comprise a tool for ensuring that intercepted communication data 120 is provided to a second entity in compliance with standards specified in the CALEA.

In general, compliance tool 138 is operable to control the conversion of intercepted data 120 from a first, non-standard compliant format to a format compliant with a standard in which it is to be provided to a requesting entity. Compliance tool 138 may be operable to convert intercepted data 120 from a first format to one or more other formats. For example, the first format may include the format in which intercepted data 120 was received from user system 106, and the second format may include a format that is compliant with the applicable standard. Compliance tool 138 may store the converted data as standardized intercepted data 146. Although only these two formats are illustrated as being stored in storage module 130a, compliance tool 138 may store any other formats of intercepted data 120, if appropriate. For example, compliance tool 138 may convert intercepted data 120 through one or more intermediate formats before generating standardized intercepted data 146.

In certain embodiments, a specialized compliance tool 148 may also facilitate the conversion of intercepted data 120 from a first, non-standard compliant format to a format compliant with a standard in which it is to be provided to a requesting entity. For example, for certain types of intercepted data 120 (e.g., data in certain proprietary formats) or for certain standards (e.g., requiring that data be provided in certain proprietary formats), specialized compliance tool 148 may provide functionality for handling processing data from or converting data to those proprietary formats.

Specialized compliance tool 148 may include any suitable combination of hardware, firmware, and software. Although in the illustrated example specialized compliance tool 148 is shown as being stored at computing system 128a, specialized compliance tool 148 may be located at any suitable location of system 100. In certain embodiments, specialized compliance tool 148 differs from compliance tool 138 in that specialized compliance tool 148 may relate to the processing of the specific type of intercepted data 120 and/or the format in which the second entity is requesting that intercepted data 120 be provided, while compliance tool 138 may relate to aspects of compliance with the standard that are generic as to the type of intercepted data 120. However, the present disclosure contemplates either or both of compliance tool 138 and specialized compliance tool 148 being configured for the particular type of intercepted data 120 and/or the format in which the second entity is requesting that intercepted data 120 be provided. One advantage of certain embodiments of the present disclosure is that the first entity may not be required to purchase and maintain specialized compliance tool 148, which may be a tool required to convert intercepted data 120 to standardized intercepted data 146. Instead, an operator of provisioned computing resources environment 104 may provide specialized compliance tool 148. If appropriate, however, the first entity may still bear the cost of purchasing specialized compliance tool 148.

Compliance tool 138 may provide the second entity access to standardized intercepted data 146. As will be described in greater detail below with respect to FIGS. 3A through 3B, standardized intercepted data 146 may be provided to the second entity in a number of ways. As just one example, the second entity may also have a designated computing resources environment configured within provisioned computing resources environment 104. In this example, it will be assumed that the designated computing resources environment of the second entity is computing resources 116b. Compliance tool 138 may copy and/or move a relevant portion of standardized intercepted data 146 from storage module 130a of computing resources 116a (designated for use by the first entity) to storage module 130b of computing resources 116b (designated for use by the second entity).

In certain embodiments, complying with a standard may include certain audit requirements. To that end, audit tool 140 may be operable to monitor for auditable events associated with the storage, conversion, and accessing of intercepted communication data. An auditable event may include receiving intercepted data 120, storing intercepted data 120, converting intercepted data between or among appropriate formats, providing access to a portion of the stored communication data, or any other types of events that may be suitable for auditing.

In certain embodiments, the ability to provide this audit trail may be required by the standard with which the first entity is complying. Additionally or alternatively, the ability to provide this audit trail may enhance the usability of the stored information (in an appropriate form) in an official proceeding. For example, in the case of a law enforcement request, it may be useful for a portion or all of the stored information to be admissible evidence in a court proceeding. Providing an appropriate audit trail of the transitions and actions with respect to the stored data (e.g., intercepted data 120 and/or standardized intercepted data 146) may help ensure that information gleaned from the data is legally admissible in court. Audit tool 140 may comprise any suitable combination of hardware, firmware, and software.

Audit data 142 may include data generated by audit tool 140 (or another suitable component of system 100) in association with auditable events. In certain embodiments, audit data 142 provides a record of a chain of custody of intercepted data 120. Audit data 142 may be associated with receiving intercepted data 120, storing intercepted data 120, converting intercepted data between or among appropriate formats (e.g. standardized intercepted data 146), providing access to a portion of the stored intercepted data, or any other suitable events that may be suitable for auditing.

In certain embodiments, audit data 142 includes one or more of timestamp information indicating when an action was performed on intercepted communication data 120, user signature information indicating a user associated with performing an action on intercepted communication data 120, and application signature information indicating an application associated with performing an action on intercepted communication data 120. Although audit data 142 is illustrated and described as being stored in storage module 114, audit data 142 may be stored in any suitable location of system 100. As just one example, audit data 142 may be stored in the designated computer resources environment of the first entity (e.g., in storage module 130a).

Compliance tool 136 and/or audit tool 138 (and/or any other suitable component of system 100) may be operable to generate one or more reports. In certain embodiments, the reports may provide one or more of a summary of at least a portion of the stored intercepted data in the second format (e.g., standardized intercepted data 146, an audit history determined from at least a portion of audit data 142, and any other suitable information. The report may provide evidence of the chain of custody of intercepted data 120 as it was process and stored in provisioned computing resources environment 104.

Compliance tool 136 and/or audit tool 138 (and/or any other suitable component of system 100) may be operable to reproduce the conversion of intercepted communication data 120. For example, at a time subsequent to the storing of intercepted communication data 120 in the second format (e.g., as standardized intercepted communication data 146 in storage module 130a), compliance tool 136 and/or audit tool 138 may be able to access intercepted communication data 120 stored in storage module 130 to reproduce the conversion of intercepted communication data 120 from the first format (e.g., the format in which it was received by processing system 112 from user system 106) to the second format (e.g., compliant with the standard).

Details regarding an example method for providing data in a standard-compliant manner are described below with respect to FIGS. 3A-3B.

As described briefly above, the second entity (i.e., the entity that requested intercepted data 120 be provided in a standard-compliant manner) may desire to convert standardized intercepted data 146 (e.g., stored in its designated computing resources 116b) to a format more useful to the second entity. Compliance tool 136 and/or audit tool 138 may facilitate allowing the second entity to operate on standardized intercepted data 146 in a manner way that the integrity of the data is maintained. An example method for accessing data that is provided in a standard-compliant manner is described in detail below with respect to FIG. 4.

System 100 provides just one example of an environment in which the techniques of the present disclosure may be used. For example, compliance and auditing techniques consistent with the present disclosure may be used with respect to any suitable type of information to be provided by a first entity to a second entity in a manner compliant with a standard.

Certain embodiments of the present disclosure may provide some, none, or all of the following technical advantages. For example, certain embodiments provide a mechanism by which a first entity 106 can respond to an information request from a second entity 108 (e.g., an information request from a law enforcement agency) in a manner compliant with an applicable standard (e.g., the CALEA) without maintaining an information technology infrastructure specifically for responding to such information requests. This may provide a more cost-effective technique for the entity to respond to such information requests.

In certain embodiments, first entity 106 may configure and gain access to a suitable portion or all of provisioned computing resources environment 104 in a "pay-as-desired" environment. This may allow first entity 106 to establish appropriate dedicated computing resources 116 (e.g., computing resources 116a), as needed for responding to a particular information request, and then to release those resources (with an appropriate clean-up process) when the use is completed. Thus, appropriate amounts of computing resources 116 of provisioned computing resources environment 104 may be provisioned and un-provisioned as needed. This may be particular beneficial since it may be relatively rare that the first entity 106 receives requests to provide information in a standard-compliant manner, especially when considered in light of the cost of maintaining appropriate resources (e.g., potentially both hardware and software resources) for responding to requests for information in a standard-compliant manner. Moreover, the scope of requests for information may vary among requests, and embodiments of the present disclosure may allow the first entity 106 to tailor the computing resources 116a used from provisioned computing resources environment 104 according to the particular request (i.e., rather than purchasing sufficient resources to handle relatively large requests that may never materialize). In other words, the first entity 106 may be able to leverage the elasticity of provisioned computing resources environment 104 to handle particular requests on an as-needed basis. Furthermore, the requesting entity may also be able to reduce or eliminate its capital investment in hardware and/or software associated with receiving or otherwise accessing information provided in response to requests.

As described above, the responding entity may provide the information to the requesting entity in a variety of ways. In certain embodiments, if both the requesting entity (e.g., second entity 108) and the responding entity (e.g., first entity 106) have dedicated computing resources 116 in provisioned computing resources environment 104, then the process of the responding entity providing information in a standard-compliant manner to the requesting entity may be further simplified. For example, the requesting entity may establish a private network connection to an appropriate portion of the responding entity's computing resources 116a (e.g., to a portion or all of storage module 130a). This may reduce or eliminate a need for the requesting entity to visit the site of the responding entity and/or to confiscate property of the responding entity. If appropriate in this scenario, the responsive information may remain in provisioned computing resources environment 104, which may reduce resource burdens on both the requesting and the responding entities and provide enhanced assurance of the validity of the provided information.

In some scenarios, the requesting entity may be responsible (e.g., as dictated by a statute or other suitable authority) for reimbursing the responding entity for a portion or all of the costs associated with providing responsive information in a standard-compliant manner. Use of provisioned computing resources environment 104 may ease the burden on both the requesting and responding entities of calculating the costs to be reimbursed. For example, certain embodiments may improve the ability to estimate costs associated with gathering and accessing responsive information in a standard-compliant manner.

In certain embodiments, an entity associated with operating or otherwise managing a portion or all of provisioned computing resources environment 104 may automatically bill the appropriate entity for costs associated with use of computing resources 116 to provide and/or access information in a standard compliant manner. For example, in the above-described scenario, the requesting entity may be responsible for reimbursing the responding entity for costs associated with providing responsive information in standard-compliant manner. However, rather than billing the responding entity and then burdening the responding entity with requesting a reimbursement from the requesting entity, certain embodiments of the present disclosure may automatically bill the requesting entity for costs associated with providing and/or accessing responsive information. The entity associated with operating or otherwise managing provisioned computing resources environment 104 may be able to determine the amount of computing resources 116 used in providing responsive information in a standard-compliant manner and the associated costs, which may facilitate this automated billing.

Certain embodiments of the present disclosure may provide some, all, or none of these advantages. Certain embodiments may provide one or more other technical advantages, some of which may be described herein and one or more of which may be readily apparent to those skilled in the art from the figures, descriptions, and claims included herein.

Figure 2:
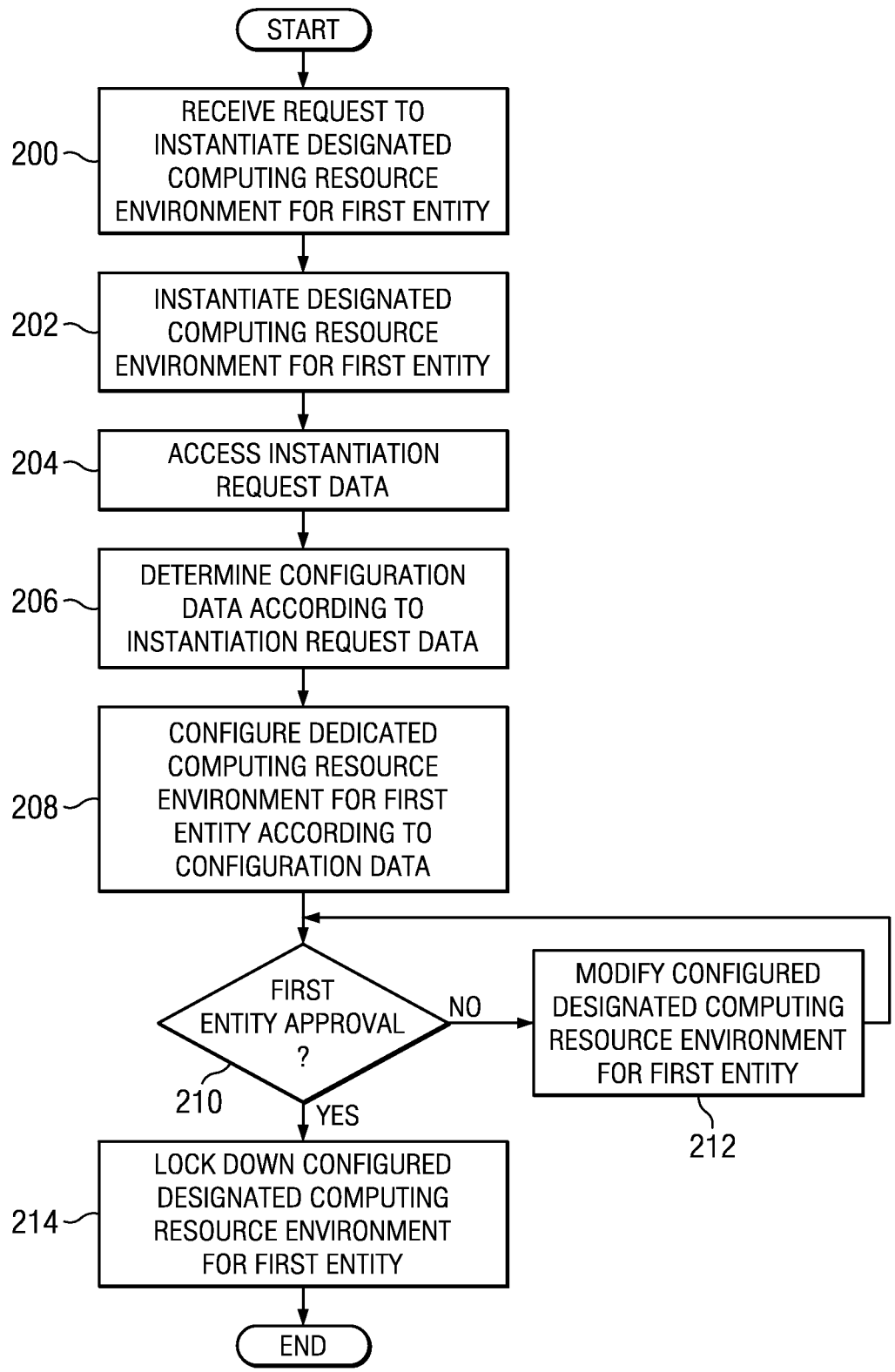
FIG. 2 illustrates an example method, which may be implemented using the system of FIG. 1, for configuring computing resources for providing data in a standard-compliant manner, according to certain embodiments of the present disclosure.

FIG. 2 illustrates an example method, which may be implemented using system 100 of FIG. 1, for configuring computing resources 116 for providing data in a standard-compliant manner, according to certain embodiments of the present disclosure.

At step 200, processing system 112 may receive a request to instantiate designated computing resource environment for a first entity. For example, configuration tool 136 may receive a request from user system 106 to instantiate designated computing resource environment for an entity associated with user system 106. User system 106 may be associated with a first entity, which may communicate the instantiation request in response to receiving a request for information from a second entity (although the present disclosure contemplates user system 106 communicating the request at any suitable time). The instantiation request may include any suitable type of information, which may be referred to as instantiation request data. For example, the instantiation request may specify one or more of the types of computing resources 116 requested, the amount of computing resources 116 requested, that standard with which the entity will be complying, and any other suitable information for configuring the designated computing resource environment or for other suitable purposes.

At step 202, processing system 112 may instantiate the designated computing resource environment for the first entity. For example, configuration tool 136 may instantiate the designated computing resource environment for the first entity. In the illustrated example, while computing resources 116 may be available for use by any of a number of entities, computing resources 116a are designated for use by the first entity. The designated computing resources environment for the first entity (i.e., designated computing resources 116a) may provide a secure environment with which the first entity can interact and process and store data (e.g., intercepted data 120).

At step 204, processing system 112 may access instantiation request data. For example, configuration tool 136 may access the instantiation request data, which may be included in the request to instantiate designated computing resource environment for a first entity. If appropriate, configuration tool 136 may store the instantiation request data (e.g., in storage module 114).

At step 206, processing system 112 may determine configuration data according to the instantiation request data. For example, configuration tool 136 may determine configuration data according to the instantiation request. If appropriate, configuration tool 136 may store the configuration data (e.g., in storage module 114). The configuration data may specify a configuration for the designated computing resource environment for the first entity (e.g., computing resources 116). In general, the configuration data may specify a configuration of the designated computing resources environment that will allow the first entity to make intercepted data 120 available to the second entity in a manner compliant with the standard.

At step 208, processing system 112 may configure the designated computing resource environment for the first entity according to the determined configuration data. In certain embodiments, configuration tool 136 may configure the designated computing resource environment for the first entity according to the determined configuration data.

As an example, configuring the designated computing resource environment for the first entity according to the determined configuration data may include assigning an appropriate compliance tool to handle intercepted data 120 received from user system 106. As another example, configuring the designated computing resource environment for the first entity according to the determined configuration data may include assigning audit tool 140 to monitor interactions with intercepted communication data 120 and its subsequent formats for auditable events. As another example, configuring the designated computing resource environment for the first entity according to the determined configuration data may include installing and/or otherwise configuring a specialized compliance tool 148 for converting intercepted data 120 to an appropriate standards compliant format. As another example, configuring the designated computing resource environment for the first entity according to the determined configuration data may include assigning appropriate access rights to the designated computing resource environment.

At step 210, processing system 112 may determine whether the first entity approves of the configured designated computing resource environment. For example, configuration tool 136 may communicate a request for approval to user system 106 requesting first entity approval of the configured designated computing resource environment. An appropriately authorized user associated with the first entity may accept or reject the configured designated computing resource environment.

If processing system 112 determines at step 210 that the first entity does not approve of the configured designated computing resource environment, then at step 212, the configured designated computing resource environment may be modified. For example, the first entity may request various modifications to the configured designated computing resources environment, and the configured designated computing resource environment may be modified to meet those requested modification. The determination at step 210 may be made as many times as appropriate to achieve an acceptable configuration of the designated computing resources environment.

If processing system 112 determines at step 210 that the first entity approves of the configured designated computing resource environment, then at step 214 processing system 112 may lock down the configured designated computing resource environment for the first entity. In certain embodiments, locking down the configured designated computing resource environment includes preventing a user (e.g., associated with user system 106) from modifying the configuration of the computing resources (e.g., computing resources 116a) in a manner that is not compliant with the applicable standard.

Once the configured designated computing resources environment is configured in a manner acceptable to the first entity, the method may end. The result of the method described with respect to FIG. 2 may be a configured designated computing resource environment that the first entity can use to provide data to the second entity in a manner compliant with an appropriate standard.

Figure 3A:
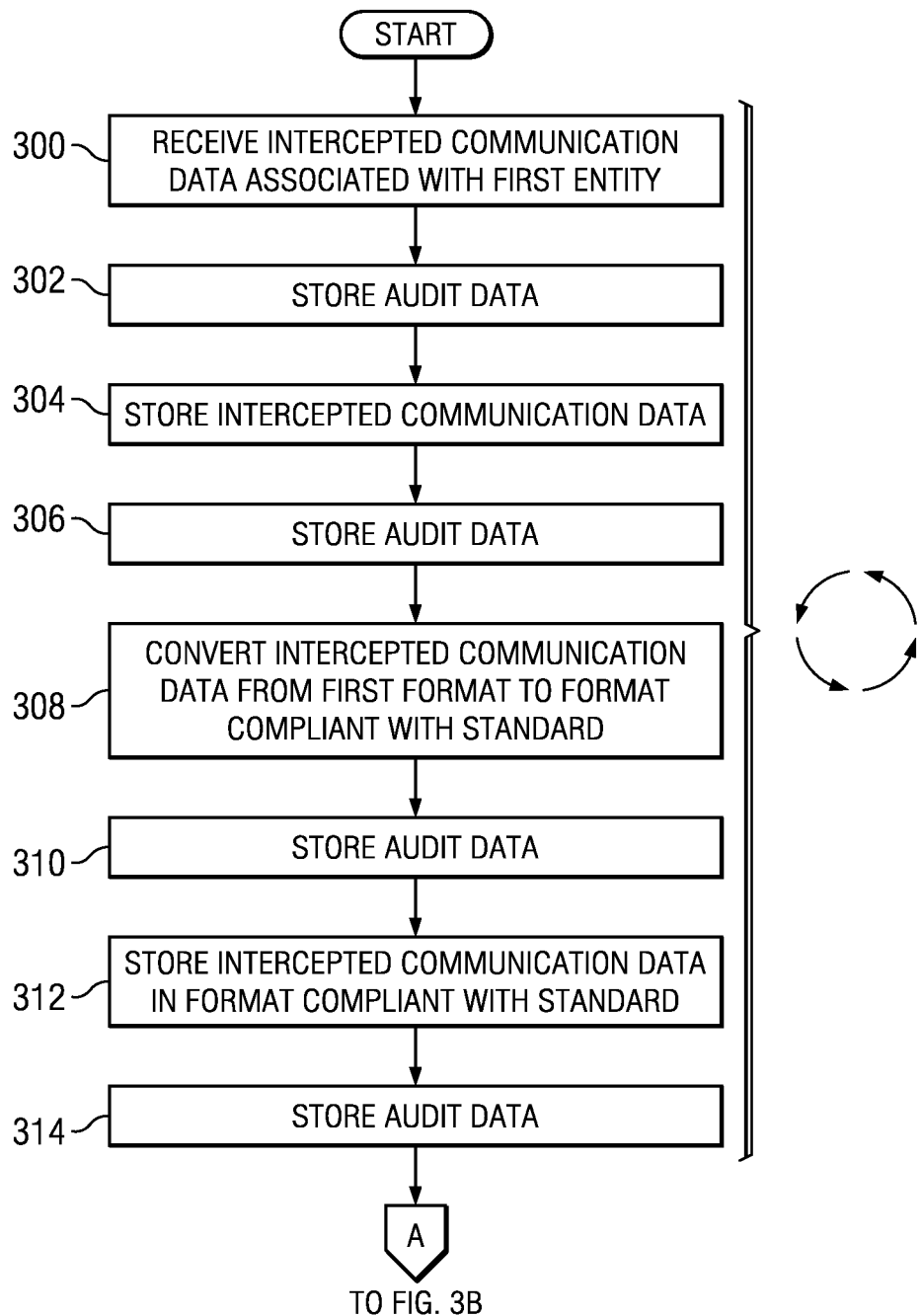
FIGS. 3A-3B illustrate an example method, which may be implemented using the system of FIG. 1, for providing data in a standard-compliant manner, according to certain embodiments of the present disclosure.
Figure 3B:
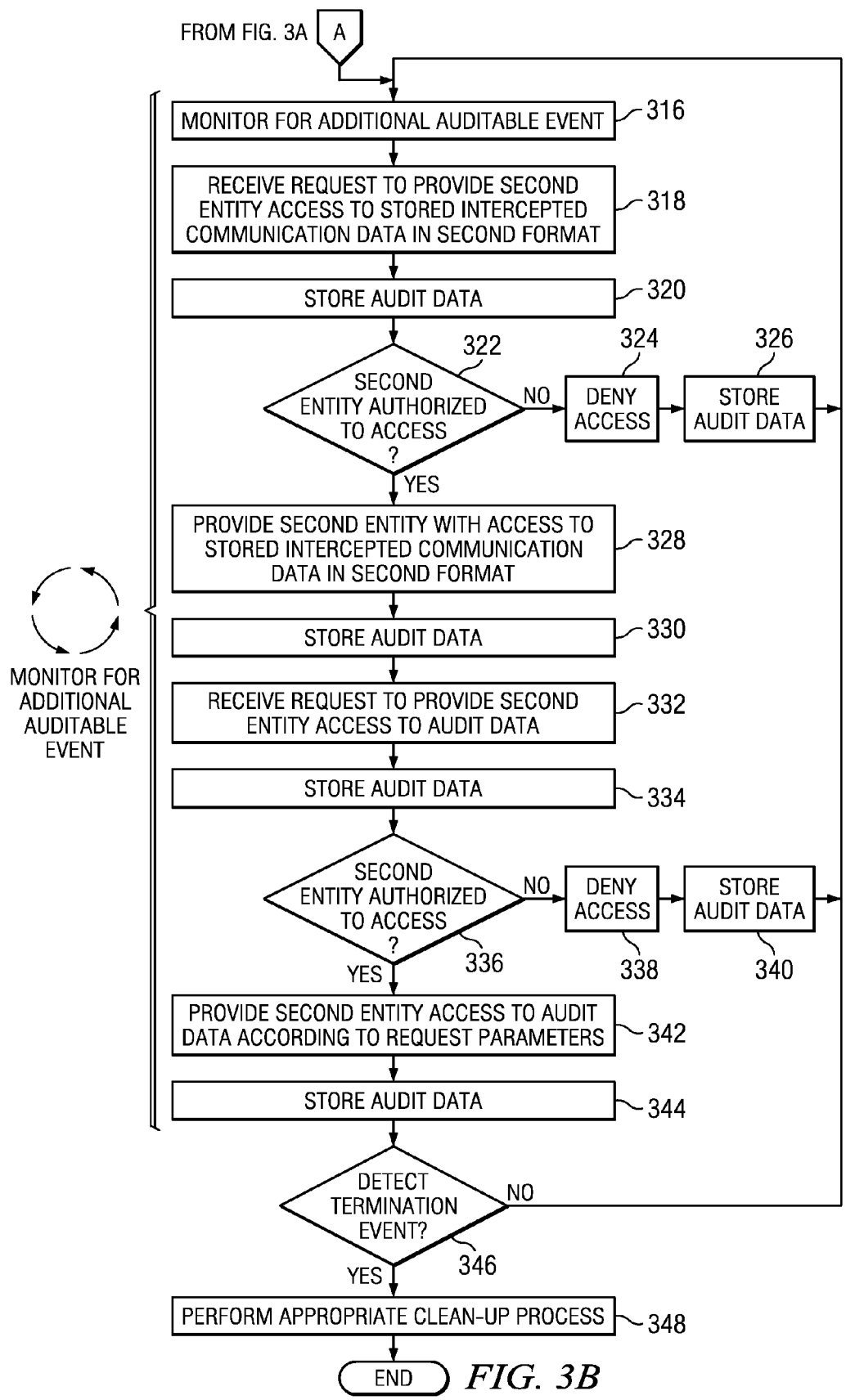

FIGS. 3A-3B illustrate an example method, which may be implemented using system 100 of FIG. 1, for providing data in a standard-compliant manner, according to certain embodiments of the present disclosure. In this particular example, it will be assumed that the data being made available by a first entity to a second entity is intercepted communication data 120 associated with monitored communication sessions (e.g., which may be collected via a wiretap). However, as described above, the present disclosure contemplates any suitable data being made available by a first entity to a second entity, according to particular needs.

At step 300, processing system 112 may receive intercepted communication data 120 associated with a first entity. For example, processing system 112 may receive intercepted communication data 120 from user system 106 associated with the first entity. Intercepted communication data 120 may be received in any suitable format that enables intercepted communication data 120 to be provided to the second entity in a manner compliant with the applicable standard. For example, intercepted communication data 120 may be received from user system 106 in the raw format in which it was captured by the first entity (e.g., from monitored components 122). As another example, any suitable processing, such as reordering of packets, may be performed on the raw captured data prior to user system 106 communicating intercepted communication data 120 to processing system 112. As another example, this processing may be performed by processing system 112, if appropriate.

At step 302, processing system 112 (e.g., audit tool 14) may store audit data 142 associated with the receipt of intercepted communication data 120.

At step 304, processing system 112 (e.g., compliance tool 138) may store the received intercepted communication data 120. For example, in an embodiment in which computing resources 116a have been designated for use by the first entity and configured appropriately for storing information in compliance with an applicable standard, compliance tool 138 may store the received intercepted communication data 120 in storage module 130a. Intercepted communication data 120 may be stored in the same format in which it was received from the first entity (e.g., via user system 106) or in a different format from the one in which it was received from the first entity.

As indicated by the revolving arrows adjacent to the bracket spanning steps 300 through 314, intercepted communication data 120 may be received, converted, and stored on an ongoing basis, such as when the information is captured by and communicated from user system 106.

At step 306, processing system 112 (e.g., audit tool 140) may store audit data 142 associated with the storing of the intercepted communication data 120.

At step 308, processing system 112 (e.g., compliance tool 138) may convert intercepted communication data 120 from the first format to a format compliant with a standard (e.g., standardized intercepted communication data 146). Although only one conversion is illustrated and described, the present disclosure contemplates converting intercepted communication data 120 through any suitable number and types of formats to reach a format appropriate for complying with the standard (e.g., standardized intercepted communication data 146). In certain embodiments, a specialized compliance tool 148 may be used to facilitate the conversion of intercepted communication data 120 from the first format to a format compliant with a standard.

At step 310, processing system 112 (e.g., audit tool 140) may store audit data 142 associated with the conversion of intercepted communication data 120 from the first format to a format compliant with a standard (e.g., standardized intercepted communication data 146).

At step 312, processing system 112 (e.g., compliance tool 138) may store intercepted communication data in a format compliant with the standard (e.g., standardized intercepted communication data 146). In certain embodiments, processing system 112 may store intercepted communication data 146 in storage module 130a of computing resources 116a. At this point, standardized intercepted communication data 146 may be available to be provided to the second entity that requested the information.

At step 314, processing system 112 (e.g., audit tool 140) may store audit data 142 associated with the storing of the intercepted communication data in the format compliant with the standard (e.g., as standardized intercepted communication data 146).

At step 316, processing system 112 (e.g., audit tool 140) may monitor for additional auditable events. For example, steps 318 through 342 illustrate monitoring for additional events according to certain embodiments, of the present disclosure. These particular events are provided for example purposes only.

At step 318, processing system 112 may receive a request to provide a second entity access to the stored intercepted communication data in the second format (e.g., standardized intercepted communication data 146). For example, user system 108 associated with the second entity may communicate a request to processing system 112 for access to standardized intercepted communication data 146 stored in storage module 130a.

At step 320, processing system 112 (e.g., audit tool 140) may store audit data 142 associated with the received request to provide the second entity access to standardized intercepted communication data 146 stored in storage module 130*a*.

At step 322, processing system 112 may determine whether the second entity is authorized to access the intercepted communication data in the second format (e.g., standardized intercepted communication data 146 stored in storage module 130*a*). As described above, when the designated computing resources environment of the first entity is configured, permissions associated with whom is authorized to access stored data may be specified. Processing system 112 may access those permissions in response to a request for access to standardized intercepted communication data 146 stored in storage module 130*a* to determine whether the requesting entity is authorized to access the data.

If processing system 112 determines at step 322 that the second entity is not authorized to access the intercepted communication data in the second format (e.g., standardized intercepted communication data 146 stored in storage module 130*a*), then at step 324, processing system 112 may deny the second entity access to the intercepted communication data in the second format (e.g., standardized intercepted communication data 146 stored in storage module 130*a*). For example, processing system 112 may communicate a denial of access message to user system 108 associated with the second entity. Additionally or alternatively, if processing system 112 determines at step 322 that the second entity is not authorized to access the intercepted communication data in the second format (e.g., standardized intercepted communication data 146 stored in storage module 130*a*), then at step 326, processing system 112 (e.g., audit tool 140) may store audit data 142 associated with one or more of the request for access to the intercepted communication data in the second format and the denial of access to the intercepted communication data in the second format.

If processing system 112 determines at step 322 that the second entity is authorized to access the intercepted communication data in the second format (e.g., standardized intercepted communication data 146 stored in storage module 130*a*), then at step 328, processing system 112 may provide the second entity access to the stored intercepted communication data in the second format (e.g., standardized intercepted communication data 146 stored in storage module 130*a*). A variety of techniques may be used to provide the second entity access to the stored intercepted communication data in the second format (e.g., standardized intercepted communication data 146 stored in storage module 130*a*). A few examples are described below.

As a first example, the second entity may also have a designated computing resources environment configured within provisioned computing resources environment 104. In this example, it will be assumed that the designated computing resources environment of the second entity is computing resources 116*b*. In such embodiments, providing the second entity access to the standardized intercepted communication data 146 stored in storage module 130*a* (designated for use by the first entity) may include copying a relevant portion of the standardized intercepted communication data 146 stored in storage module 130*a* from storage module 130*a* to another storage module 130*b* designated for use by the second entity).

As another example, providing the second entity access to the standardized intercepted communication data 146 stored in storage module 130*a* (designated for use by the first entity) may include authorizing one or more users of the second entity to access standardized intercepted communication data 146 in storage module 130*a* (designated for the first entity).

As yet another example, providing the second entity access to the standardized intercepted communication data 146 stored in storage module 130*a* (designated for use by the first entity) may include removing one or more storage media storing the intercepted communication data in the second format and delivering the one or more storage media to the second entity. In this example, a pertinent portion of storage module 130*a* storing relevant standardized intercepted communication data 146 may be removed and delivered to the second entity. Additionally or alternatively, rather than removing portions of storage module 130*a*, relevant portions of standardized intercepted communication data 146 may be copied from storage module 130*a* to a portable storage medium (either computer-readable or another suitable format) to be delivered to the second entity.

At step 330 processing system 112 (e.g., audit tool 140) may store audit data 142 associated with the provision to the second entity of access to the stored intercepted communication data in the second format (e.g., standardized intercepted communication data 146).

At step 332, processing system 112 may receive a request to provide the second entity access to audit data 142. For example, user system 108 associated with the second entity may communicate a request to processing system 112 for access to a portion or all of audit data 142.

At step 334, processing system 112 (e.g., audit tool 140) may store audit data 142 associated with the received request for access to audit data 142.

At step 336, processing system 112 may determine whether the second entity is authorized to access audit data 142. As described above, when the designated computing resources environment of the first entity is configured, permissions associated with whom is authorized to access stored data may be specified. Processing system 112 may access those permissions in response to a request for access to audit data 142 to determine whether the requesting entity is authorized to access the requested audit data 142.

If processing system 112 determines at step 336 that the second entity is not authorized to access the requested audit data 142, then at step 338, processing system 112 may deny the second entity access to the requested audit data 142. For example, processing system 112 may communicate a denial of access message to user system 108 associated with the second entity. Additionally or alternatively, if processing system 112 determines at step 336 that the second entity is not authorized to access the requested audit data 142, then at step 340, processing system 112 (e.g., audit tool 140) may store audit data 142 associated with one or more of the request for access to audit data 142 and the denial of access to the requested audit data 142.

If processing system 112 determines at step 336 that the second entity is authorized to access the requested audit data 142, then at step 342, processing system 112 may provide the second entity access to the requested audit data 142. A variety of techniques may be used to provide the second entity access to the stored audit data 142. For example, any of the techniques described above for providing the second entity access to standardized intercepted communication data 146 stored in storage module 130*a* may be used to provide the second entity with access to stored audit data 142. At step 344 processing system 112 (e.g., audit tool 140) may store audit data 142 associated with the provision to the second entity of the requested audit data 142.

As indicated by the revolving arrows adjacent to the bracket spanning steps 316 through 344, processing system 112 may monitor for auditable events on an ongoing basis. Additionally, although these particular auditable events are described, the present disclosure contemplates processing system 112 (e.g., audit tool 140) monitoring for any suitable auditable events.

At step 346 processing system 112 may determine whether a termination event has been detected. For example, the first entity (e.g., via user system 106) may communicate a request indicating that the instantiation of the designated computing resources environment for the first entity (e.g., computing resources 116a) should be terminated. Alternatively, the request may simply indicate that storage module 130a should be wiped clean of any information related to standardized intercepted data 146 and its subsequent processing, including possibly audit data 142.

If processing system 112 (e.g., configuration tool 136) determines at step 346 that a termination event has not been detected, then the method may return to step 316 at which processing system 112 (e.g., audit tool 140) may continue to monitor for an auditable event. Processing system 112 may also continue to receive and process intercepted communication data 120 (e.g., at steps 200 through 314), if appropriate.

If processing system 112 (e.g., configuration tool 136) determines at step 346 that a termination event has been detected, then at step 348 processing system 112 (e.g., configuration tool 136) may terminate the instantiation of the designated computing resources environment for the first entity and perform an appropriate clean-up process. The appropriate clean-up process may include wiping any relevant storage volumes (e.g., storage module 130a) clean of any information related to standardized intercepted data 146 and its subsequent processing, including possibly audit data 142. In certain embodiments, in response to the termination event, processing system 112 may make a portion or all of the computing resources 116 that were designated for use by the first entity available for use by any of a number of entities (e.g., by returning computing resources 116a to a pool of computing resources 116 available to be provisioned for use by any of a number of entities).

It should also be noted that throughout the example processing described above, processing system 112 may add or remove computing resources 116 to or from the computing resources designated for use by the first entity (e.g., computing resources 116a). Thus, at various times, computing resources designated for use by the first entity (computing resources 116a) may include varying amounts of computing resources. This may provide a flexible, pay-as-needed type of environment for the first entity.

Figure 4:
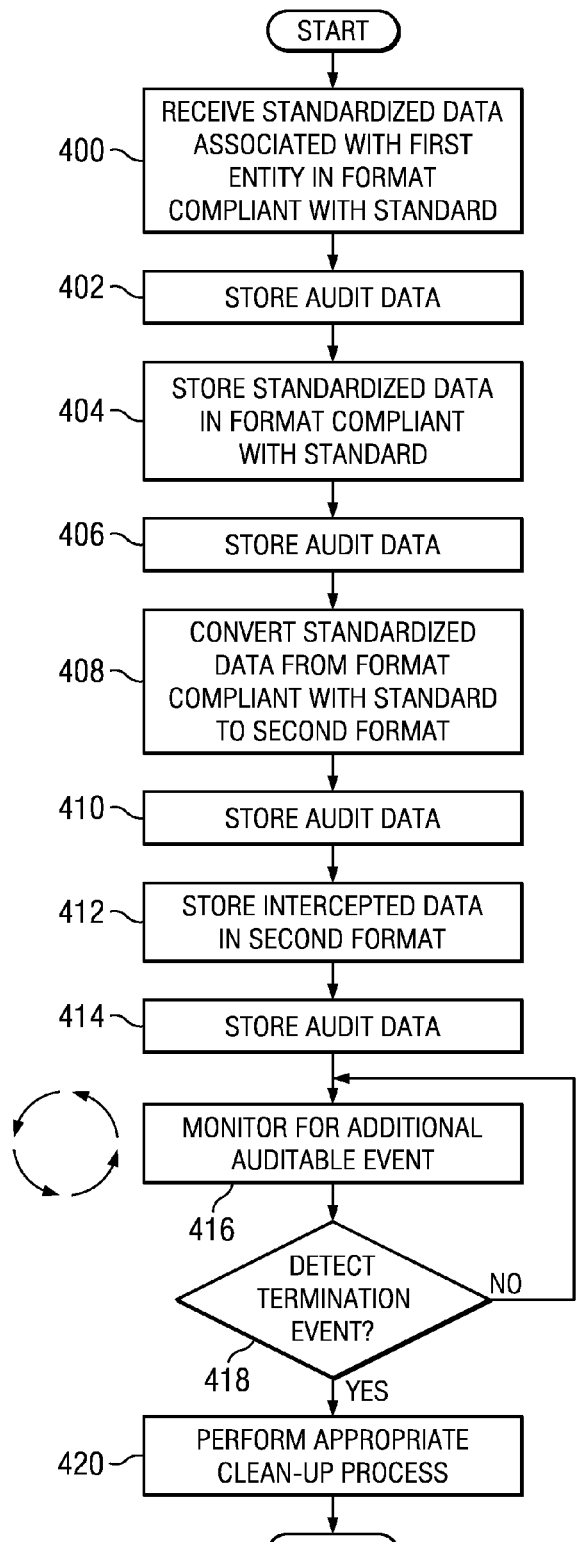
FIG. 4 illustrates an example method, which may be implemented using the system of FIG. 1, for accessing data that is provided in a standard-compliant manner, according to certain embodiments of the present disclosure.

FIG. 4 illustrates an example method, which may be implemented using system 100 of FIG. 1, for accessing data that is provided in a standard-compliant manner, according to certain embodiments of the present disclosure.

At step 400, processing system 112 may receive standardized intercepted data 146 associated with a first entity in a format that is compliant with a standard. For example, a second entity may have been provided information from a first entity in a manner compliant with a standard. However, the second entity may desire to have this information converted into another format for use. It may be appropriate to monitor this conversion process in an auditable manner such that the authenticity of the information can be verified at a later time. In certain embodiments, a portion of computing resources 116 (e.g., computing resources 116b) may be designated for use by the second entity, and receiving the standardized intercepted data 146 may simply comprise accessing that data stored in storage module 130b designated to the second entity.

At step 402, audit tool 140 may store audit data 142 associated with the receipt of standardized intercepted data 146 associated with the first entity in the format that is compliant with the standard.

At step 404, processing system 112 (e.g., compliance tool 138) may store the received standardized intercepted data 146 associated with the first entity in the format that is compliant with the standard. For example, the received standardized intercepted data 146 associated with the first entity in the format that is compliant with the standard may be stored in storage module 130b. This stored data may provide a reliable copy of the received standardized intercepted data 146.

At step 406, audit tool 140 may store audit data 142 associated with the storing of intercepted data 146 associated with the first entity in the format that is compliant with the standard.

At step 408, processing system 112 (e.g., compliance tool 138) may convert standardized intercepted communication data 146 from the format compliant with the standard to a second format. Although only one conversion is illustrated and described, the present disclosure contemplates converting standardized intercepted data 146 through any suitable number and types of formats to reach a format appropriate for the second entity. For example, the second entity may provide instructions for the format to which the standardized intercepted data 146 should be converted. In certain embodiments, the format may simply be the original format in which the intercepted data 120 was received from the first entity.

At step 410, audit tool 140 may store audit data 142 associated with the conversion of standardized intercepted data 146.

At step 412, processing system 112 (e.g., compliance tool 138) may store the converted standardized intercepted communication data 146 in the second format. For example, processing system 112 may store the converted standardized intercepted communications data 146 in the second format in storage module 130b.

At step 414, audit tool 140 may store audit data 142 associated with the storing of standardized intercepted data 146 in the second format.

At step 416, audit tool 140 may monitor for additional auditable events. These auditable events may include any suitable types of events. For example, auditable events may include additional conversions of the stored data, other processing performed on the stored data, requests for access to the stored data, granting of access to the stored data, and any other suitable events that may be appropriate to monitor for recording a chain of custody and other information regarding the stored data. Each time an auditable event is detected (e.g., by audit tool 140), audit tool 140 may store audit data 142 associated with the auditable event.

At step 418, processing system 112 (e.g., configuration tool 136) may determine whether a termination event has been detected. For example, the second entity (e.g., via user system 108) may communicate a request indicating that the instantiation of the designated computing resources environment for the second entity (e.g., computing resources 116b) should be terminated. Alternatively, the request may simply indicate that storage module 130b should be wiped clean of any information related to standardized intercepted data 146 and its subsequent processing, including possibly audit data 142.

If processing system 112 (e.g., configuration tool 136) determines at step 418 that a termination event has not been detected, then the method may return to step 416 at which processing system 112 (e.g., audit tool 140) may continue to monitor for an auditable event.

If processing system 112 (e.g., configuration tool 136) determines at step 418 that a termination event has been detected, then at step 420 processing system 112 (e.g., configuration tool 136) may terminate the instantiation of the designated computing resources environment for the second entity and perform an appropriate clean-up process. The appropriate clean-up process may include wiping any relevant storage volumes (e.g., storage module 130b) clean of any information related to standardized intercepted data 146 and its subsequent processing, including possibly audit data 142. In certain embodiments, in response to the termination event, processing system 112 may make a portion or all of the computing resources 116 that were designated for use by the second entity available for use by any of a number of entities (e.g., by returning computing resources 116b to a pool of computing resources 116 available to be provisioned for use by any of a number of entities).

It should also be noted that throughout the example processing described above, processing system 112 may add or remove computing resources 116 to or from the computing resources designated for use by the second entity (e.g., computing resources 116b). Thus, at various times, computing resources designated for use by the second entity (computing resources 116b) may include varying amounts of computing resources. This may provide a flexible, pay-as-needed type of environment for the second entity.

The methods described above with respect to FIGS. 2-4 may be implemented in any suitable combination of software, firmware, and hardware. Additionally, although particular components may be identified as performing particular steps of the methods described above with respect to FIGS. 2-4, the present disclosure contemplates any suitable components performing the steps according to particular needs.

Figure 5:
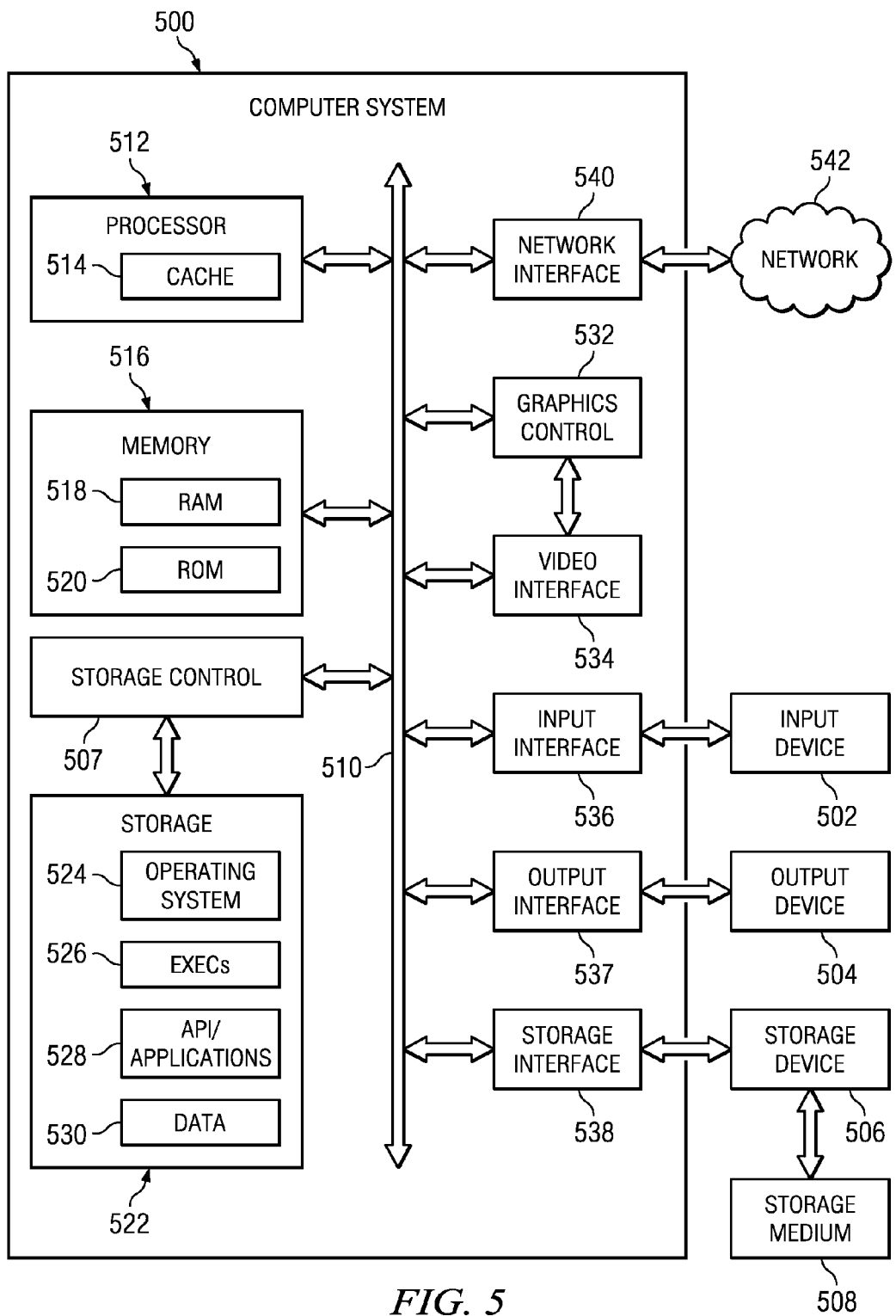
FIG. 5 illustrates an example computer system that may be used for one or more portions of the system of FIG. 1, according to certain embodiments of the present disclosure.

FIG. 5 illustrates an example computer system 500 that may be used for one or more portions of system 100 of FIG. 1, according to certain embodiments of the present disclosure. Although the present disclosure describes and illustrates a particular computer system 500 having particular components in a particular configuration, the present disclosure contemplates any suitable computer system having any suitable components in any suitable configuration. Moreover, computer system 500 may have take any suitable physical form, such as for example one or more integrated circuit (ICs), one or more printed circuit boards (PCBs), one or more handheld or other devices (such as mobile telephones or PDAs), one or more personal computers, one or more super computers, one or more servers, and one or more distributed computing elements. Portions or all of user systems 104 and 108, processing system 112, storage module 114, and computing resources 116 may be implemented using all of the components, or any appropriate combination of the components, of computer system 500 described below.

Computer system 500 may have one or more input devices 502 (which may include a keypad, keyboard, mouse, stylus, or other input devices), one or more output devices 504 (which may include one or more displays, one or more speakers, one or more printers, or other output devices), one or more storage devices 506, and one or more storage media 508. An input device 502 may be external or internal to computer system 500. An output device 504 may be external or internal to computer system 500. A storage device 506 may be external or internal to computer system 500. A storage medium 508 may be external or internal to computer system 500.

System bus 510 couples subsystems of computer system 500 to each other. Herein, reference to a bus encompasses one or more digital signal lines serving a common function. The present disclosure contemplates any suitable system bus 510 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 500 includes one or more processors 512 (or central processing units (CPUs)). A processor 512 may contain a cache 514 for temporary local storage of instructions, data, or computer addresses. Processors 512 are coupled to one or more storage devices, including memory 516. Memory 516 may include RAM 518 and ROM 520. Data and instructions may transfer bi-directionally between processors 512 and RAM 518. Data and instructions may transfer uni-directionally to processors 512 from ROM 520. RAM 518 and ROM 520 may include any suitable computer-readable storage media.

Computer system 500 includes fixed storage 522 coupled bi-directionally to processors 512. Fixed storage 522 may be coupled to processors 512 via storage control unit 507. Fixed storage 522 may provide additional data storage capacity and may include any suitable computer-readable storage media. Fixed storage 522 may store an operating system (OS) 524, one or more executables (EXECs) 526, one or more applications or programs 528, data 530 and the like. Fixed storage 522 is typically a secondary storage medium (such as a hard disk) that is slower than primary storage. In appropriate cases, the information stored by fixed storage 522 may be incorporated as virtual memory into memory 516. In certain embodiments, fixed storage 522 may include network resources, such as one or more storage area networks (SAN) or network-attached storage (NAS).

Processors 512 may be coupled to a variety of interfaces, such as, for example, graphics control 532, video interface 534, input interface 536, output interface 537, and storage interface 538, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 540 may couple processors 512 to another computer system or to network 542. Network interface 540 may include wired, wireless, or any combination of wired and wireless components. Such components may include wired network cards, wireless network cards, radios, antennas, cables, or any other appropriate components. With network interface 540, processors 512 may receive or send information from or to network 542 in the course of performing steps of certain embodiments. Certain embodiments may execute solely on processors 512. Certain embodiments may execute on processors 512 and on one or more remote processors operating together.

In a network environment, where computer system 500 is connected to network 542, computer system 500 may communicate with other devices connected to network 542. Computer system 500 may communicate with network 542 via network interface 540. For example, computer system 500 may receive information (such as a request or a response from another device) from network 542 in the form of one or more incoming packets at network interface 540 and memory 516 may store the incoming packets for subsequent processing. Computer system 500 may send information (such as a request or a response to another device) to network 542 in the form of one or more outgoing packets from network interface 540, which memory 516 may store prior to being sent. Processors 512 may access an incoming or outgoing packet in memory 516 to process it, according to particular needs.

Certain embodiments involve one or more computer-storage products that include one or more tangible, computer-readable storage media that embody software for performing one or more steps of one or more processes described or illustrated herein. In certain embodiments, one or more portions of the media, the software, or both may be designed and manufactured specifically to perform one or more steps of one or more processes described or illustrated herein. Additionally or alternatively, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In certain embodiments, software may be machine code which a compiler may generate or one or more files containing higher-level code which a computer may execute using an interpreter.

As an example and not by way of limitation, memory 616 may include one or more tangible, computer-readable storage media embodying software and computer system 500 may provide particular functionality described or illustrated herein as a result of processors 512 executing the software. Memory 516 may store and processors 512 may execute the software. Memory 516 may read the software from the computer-readable storage media in mass storage device 516 embodying the software or from one or more other sources via network interface 540. When executing the software, processors 512 may perform one or more steps of one or more processes described or illustrated herein, which may include defining one or more data structures for storage in memory 516 and modifying one or more of the data structures as directed by one or more portions the software, according to particular needs.

In certain embodiments, the described processing and memory elements (such as processors 512 and memory 516) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing.

In addition or as an alternative, computer system 500 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A system, comprising:
one or more memory units; and
one or more processing units operable to:
  access instantiation request data for establishing, from a plurality of computing resources available for use by a plurality of entities, a subset of the plurality of computing resources to be designated for use by a first entity in association with processing and storing intercepted communication data associated with the first entity in a manner compliant with a standard, wherein the standard provides a framework for providing the intercepted communication data to a second entity, the instantiation request data specifying the standard;
  determine configuration data according to the accessed instantiation request data, the configuration data for configuring the subset of the plurality of computing resources designated for use by the first entity to implement functionality for complying with the standard;
  configure the subset of the plurality of computing resources designated for use by the first entity according to the determined configuration data;
  receive intercepted communication data associated with the first entity at the subset of the plurality of computing resources, wherein the intercepted communication data is intercepted by the first entity from a communication session and the instantiation request data specifies a type of the communication session;
  convert the intercepted communication data from a first format to a second format via the subset of the plurality of computing resources, wherein the second format is compliant with the standard;
  store, in the one or more memory units, the intercepted communication data in the second format, wherein the one or more memory units are part of the subset of the plurality of computing resources designated for use by the first entity;
  store, in one or more memory units, audit data providing a record of a chain of custody of the intercepted communication data, the audit data associated with a conversion of the intercepted communication data from the first format to the second format; and provide access to a portion of the stored intercepted communication data in the second format to the second entity, the second entity comprising an entity authorized to access the intercepted communication data.

2. The system of claim 1, wherein the audit data is further associated with receiving the intercepted communication data, storing the intercepted communication data in the second format, and providing access to the portion of the stored intercepted communication data.

3. The system of claim 2, wherein the audit data comprises one or more of the following:

timestamp information indicating when an action was performed on the intercepted communication data;

user signature information indicating a user associated with performing an action on the intercepted communication data; and application signature information indicating an application associated with performing an action on the intercepted communication data.

4. The system of claim 1, wherein:

the standard for providing the intercepted communication data to the second entity is provided by the Communications Assistance for Law Enforcement Act (CALEA);

the first entity comprises a communications service provider;

the second entity comprise a law enforcement agency; and the intercepted communication data comprises data generated by one or more users of the communications service provider during the communication session, the first entity intercepting the intercepted communication data in response to a request from the law enforcement agency.

5. A non-transitory computer-readable medium comprising logic, the logic when executed by one or more processing units operable to perform operations comprising:

accessing instantiation request data for establishing, from a plurality of computing resources available for use by a plurality of entities, a subset of the plurality of computing resources to be designated for use by a first entity in association with processing and storing intercepted communication data associated with the first entity in a manner compliant with a standard, wherein the standard provides a framework for providing the intercepted communication data to a second entity, the instantiation request data specifying the standard;

determining configuration data according to the accessed instantiation request data, the configuration data for configuring the subset of the plurality of computing resources designated for use by the first entity to implement functionality for complying with the standard;

configuring the subset of the plurality of computing resources designated for use by the first entity according to the determined configuration data;

receiving intercepted communication data associated with the first entity at the subset of the plurality of computing resources, wherein the intercepted communication data is intercepted by the first entity from a communication session and the instantiation request data specifies a type of the communication session;

converting the intercepted communication data from a first format to a second format via the subset of the plurality of computing resources, wherein the second format is compliant with the standard;

storing, in one or more memory units, the intercepted communication data in the second format, wherein the one or more memory units are part of the subset of the plurality of computing resources designated for use by the first entity;

storing, in one or more memory units, audit data providing a record of a chain of custody of the intercepted communication data, the audit data associated with the conversion of the intercepted communication data from the first format to the second format; and providing access to a portion of the stored intercepted communication data in the second format to the second entity, the second entity comprising an entity authorized to access the intercepted communication data.

6. The non-transitory computer-readable medium of claim 5, wherein the audit data further comprises one or more of the following:

timestamp information indicating when an action was performed on the intercepted communication data;

user signature information indicating a user associated with performing an action on the intercepted communication data; and application signature information indicating an application associated with performing an action on the intercepted communication data.

7. The non-transitory computer-readable medium of claim 5, wherein the operations further comprise storing the intercepted communication data in the first format such that the conversion of the intercepted communication data from the first format to the second format can be reproduced at a time subsequent to storing the intercepted communication data in the second format.

8. The non-transitory computer-readable medium of claim 5, wherein the first format is a format in which the first entity communicates the intercepted communication data to the one or more processing units.

9. The non-transitory computer-readable medium of the claim 5, wherein the operations further comprise preventing a user from modifying the configuration of the subset of the plurality of computing resources in a manner that is not compliant with the standard.

10. The non-transitory computer-readable medium of claim 9, wherein the operations further comprise receiving from the first entity, prior to preventing the user from modifying the configuration of the subset of the plurality of computing resources in a manner that is not compliant with the standard, an approval of the configured subset of the plurality of computing resources designated for use by the first entity.

11. The non-transitory computer-readable medium of claim 5, wherein the standard for providing the intercepted communication data to the second entity is provided by the Communications Assistance for Law Enforcement Act (CALEA).

12. The non-transitory computer-readable medium of claim 5, wherein the first entity comprises a communications service provider and the intercepted communication data comprises data generated by one or more users of the communications service provider during the communication session.

13. The non-transitory computer-readable medium of claim 5, wherein the communication session comprises one or more of the following:

a telecommunications session;

a broadband session; and a voice over Internet Protocol (VoIP) session.

14. The non-transitory computer-readable medium of claim 5, wherein:
- the second entity comprise a law enforcement agency; and
- the first entity intercepts the intercepted communication data in response to a request from the law enforcement agency.

15. A computer-implemented method, comprising:
- accessing instantiation request data for establishing, from a plurality of computing resources available for use by a plurality of entities, a subset of the plurality of computing resources to be designated for use by a first entity in association with processing and storing intercepted communication data associated with the first entity in a manner compliant with a standard, wherein the standard provides a framework for providing the intercepted communication data to a second entity, the instantiation request data specifying the standard;
- determining configuration data according to the accessed instantiation request data, the configuration data for configuring the subset of the plurality of computing resources designated for use by the first entity to implement functionality for complying with the standard;
- configuring the subset of the plurality of computing resources designated for use by the first entity according to the determined configuration data;
- receiving intercepted communication data associated with the first entity at the subset of the plurality of computing resources, wherein the intercepted data is intercepted by the first entity from a communication session and the instantiation request data specifies a type of the communication session;
- converting the intercepted communication data from a first format to a second format via the subset of the plurality of computing resources, wherein the second format is compliant with the standard;
- storing, in one or more memory units, the intercepted communication data in the second format, wherein the one or more memory units are part of the subset of the plurality of computing resources designated for use by the first entity;
- storing, in one or more memory units audit data providing a record of a chain of custody of the intercepted communication data, the audit data associated with the conversion of the intercepted communication data from the first format to the second format; and
- providing access to a portion of the stored intercepted communication data in the second format to the second entity, the second entity comprising an entity authorized to access the intercepted communication data.

16. The computer-implemented method of claim 15, wherein the audit data is associated with receiving the intercepted data, storing the intercepted data in the second format, and providing access to the portion of the stored intercepted data.

17. The computer-implemented method of claim 16, wherein the audit data comprises one or more of the following:
- timestamp information indicating when an action was performed on the intercepted data;
- user signature information indicating a user associated with performing an action on the intercepted data; and
- application signature information indicating an application associated with performing an action on the intercepted data.

18. The computer-implemented method of claim 15, wherein providing access to the portion of the stored intercepted data in the second format to the second entity comprises copying the portion of the stored intercepted data in the second format from the one or more memory units to another one or more memory units that are part of another subset of the computing resources designated for use by the second entity.

19. The computer-implemented method of claim 15, wherein providing access to the portion of the stored intercepted data in the second format to the second entity comprises authorizing one or more users of the second entity to access a portion of the one or more memory units on which the intercepted data in the second format is stored.

20. The computer-implemented method of claim 15, wherein providing access to the portion of the stored intercepted data in the second format to the second entity comprises:
- removing one or more storage media storing the intercepted data in the second format; and
- delivering the one or more storage media to the second entity.

21. The computer-implemented method of claim 15, further comprising storing the intercepted data in the first format such that the conversion of the intercepted data from the first format to the second format can be reproduced at a time subsequent to storing the intercepted data in the second format.

22. The computer-implemented method of claim 15, further comprising generating a report providing one or more of:
- a summary of at least a portion of the stored intercepted data in the second format; and
- an audit history determined from at least a portion of the audit data.

23. The computer-implemented method of the claim 15, further comprising preventing a user from modifying the configuration of the subset of the plurality of computing resources in a manner that is not compliant with the standard.

24. The computer-implemented method of claim 15, wherein the standard for providing the intercepted data to the second entity is provided by the Communications Assistance for Law Enforcement Act (CALEA).

25. The computer-implemented method of claim 15, wherein the first entity comprises a communications service provider and the intercepted data comprises intercepted communication data generated by one or more users of the communications service provider during a communication session.

26. The computer-implemented method of claim 25, wherein the communication session comprises one or more of the following:
- a telecommunications session;
- a broadband session; and
- a voice over Internet Protocol (VoIP) session.

27. The computer-implemented method of claim 15, wherein:
- the second entity comprise a law enforcement agency; and
- the first entity intercepts the intercepted data in response to a request from the law enforcement agency.

28. The computer-implemented method of claim 15, wherein the first format is a format in which the first entity communicates the intercepted data to the subset of the plurality of computing resources.

29. The computer-implemented method of claim 15, wherein a second subset of the plurality of computing resources available for use by the plurality of entities have been designated for use by a second entity that is distinct from the first entity.

30. The computer-implemented method of claim 15, further comprising making, in response to a termination event, the subset of the plurality of computing resources available for use by any of the plurality of entities.

31. The computer-implemented method of claim 15, wherein:
- the subset of the plurality of computing resources designated for use by the first entity comprises a first amount of resources; and
- the method further comprises modifying the first subset of the plurality of computing resources designated for use by the first entity to include a different second amount of computing resources, wherein modifying the subset of the plurality of computing resources comprises one or more of:
  - adding a portion of the plurality of the computing resources available for use by the plurality of entities to the subset of the plurality of computing resources designated for use by the first entity; and
  - returning a portion of the subset of the plurality of computing resources designated for use by the first entity to the plurality of computing resources available for use by the plurality of entities.

* * * * *